United States Patent Office 3,227,559
Patented Jan. 4, 1966

3,227,559
ESTER REACTION COMPOSITION AND METHOD
OF MAKING THE SAME
Sol B. Radlove, 5220 W. Van Buren St., Chicago, Ill.
No Drawing. Filed Sept. 14, 1962, Ser. No. 223,823
25 Claims. (Cl. 99—123)

This application is a continuation-in-part of application Serial No. 159,782, filed December 15, 1961 and now abandoned, which was a continuation-in-part of application Serial No. 52,342, filed August 29, 1960 and now abandoned, which was a continuation-in-part of application Serial No. 854,536, filed November 23, 1959 and now issued as United States Patent No. 3,051,731.

This invention relates to new compositions of matter and the methods of making the same. More particularly, it relates to reaction products which may be used as additives for direct incorporation as a component of foods or as an agent dispersible in edible liquid or plastic triglyceride compositions. Still more particularly, it relates to compositions comprising reaction products of organic tribasic hydroxy acids and fatty acid glycerides.

The products of this invention are formed by the reaction of an acid such as citric acid with fatty acid glycerides, the reaction preferably being made in the presence of a saturated monohydroxy alcohol reactant, under conditions to esterify as a minimum an average of two of the carboxyl groups of the citric acid and preferably to esterify a maximum number of the carboxyl groups of the citric acid without appreciable gelation.

The culinary art has used emulsifiers and related additives alone or in liquid and plastic triglycerides of vegetable and animal origin for a variety of purposes. Generally, emulsifiers and supplemental agents are designed to improve one or more properties of the material into which it is incorporated. One particular use of the additives is in edible oils to adapt them for use, for example, in margarine, in high sugar content cakes, etc.

In the specific field of shortenings it has become the practice in recent years to incorporate into the basic oil components, additives such as fatty acid esters, namely, monoglycerides, diglycerides, polyglycerides, or mixtures thereof. The lactic acid-fatty acid-glyceride esters, as disclosed in Iveson et al. Patent No. 2,690,971, have been useful for this purpose as are similar esters prepared by the reaction of one mole fatty acid monoglyceride with one mole of lactic acid, etc. While these esters have improved the volume and texture attainable with plastic shortenings, particularly in relation to the preparation of cakes containing high ratios of sugar to flour, such agents have not been correspondingly effective when incorporated into normally liquid shortenings.

The prior art also discloses additives for shortenings such as the fatty acid esters of the lactic acid triester of glycerine. The utility of shortenings containing such an additive is said to be enhanced by the addition of minor proportions of specified supplemental agents, such as monostearin, distearin and stearic acid monoester of diglycerol, esters of diacetyl tartaric acid, esters of acetyl citric acid and alcohols such as stearyl alcohol, and citric acid ester reaction products wherein cetyl or stearyl alcohol in a ratio of about 2 moles of alcohol to 1 mole of citric acid are reacted under esterification conditions. When these supplemental agents are used in conjunction with edible fatty acid triglyceride shortenings, their purpose is to increase the amounts of air which can be incorporated into flour or cake batters. Such agents, however, tend to lower the smoke point of the liquid shortenings and, in many instances, to impart sharp flavor or taste, characteristics undesirable in a commercial product.

I have discovered that products obtained according to this invention are valuable for many purposes. For example, they are useful as direct additives or as agents dispersed in liquid or plastic triglyceride compositions. The products may be utilized in the preparation of doughnut, waffle, pancake and cake mixes to provide baked products of improved texture, etc., in butter, margarine and cooking oils, in frozen batters, frozen custards, frozen desserts and ice cream, in emulsified edible oil compositions such as mayonnaise and salad dressings, in beverages, in icings and toppings such as butter-cream icing, cooked and uncooked chocolate coatings, etc., in synthetic cream whips, in cosmetics and the like.

The citric acid ester products, for example, are effective for direct incorporation into batter compositions of cake mixes or for indirect incorporation through preincorporation in shortenings used in the preparation of the batters. When used in cake preparation, the citric acid ester products of this invention do not increase the amount of air that can be whipped into farinaceous batters but, in conjunction with ester type emulsifiers, they effect a remarkable improvement in stability of batter compositions before and during baking. This stabilization is evidenced in cakes by a center which rises to produce a high peak and does not fall either during or after baking. The citric acid ester products are also effective antispattering agents; in this characteristic, they enhance the effect of lecithin and similar emulsifiers in margarines and cooking oils.

The esters when incorporated into icings directly or indirectly through preincorporation into shortenings, are effective to inhibit moisture weeping and crust formation.

The reaction products of the present invention are prpeared by reacting an organic saturated tribasic hydroxy acid, for example, citric acid, with a glyceride ester in which glycerol is partially esterified with fatty acid. The glyceride ester reactant may be fatty acid monoglycerides such as cottonseed oil monoglycerides, or mixtures of fatty acid monoglycerides and fatty acid diglycerides. A third component, namely, a saturated monohydric alcohol having 12 to 24 carbon atoms, such as cetyl alcohol, stearyl alcohol and the like, may be substituted for a portion of the glyceride ester reactant, for simultaneous reaction. The products of reaction of the three component system, namely, fatty acid glyceride, citric acid and saturated monohydric alcohol are preferred for use in shortenings intended for incorporation into baked goods because they exhibit enhanced effectiveness.

Monoglycerides and diglycerides useful in this invention, are the fatty acid glycerides which can be prepared from natural or hydrogenated vegetable oils, for example, cottonseed oil, soybean oil, coconut oil, palm oil, and the like, through glycerolysis, or through the direct esterification of glycerine with fatty acids. These glycerides have either one or two unesterified hydroxyl groups which react with the carboxyl groups of the citric acid so that products are formed having the carboxyl groups of the citric acid esterified to such an extent that the acid numbers of the products generally fall in the range between about 12 and 75.

When products are formed by the reaction of one mole of citric acid with two moles of glycerides or glycerides plus alcohol the acid number of products will usually fall in the range between about 50 and 75.

The nature of the glyceride ester component of the reaction mixtures has been found to have an appreciable effect upon the yield of citric acid ester. When reacting citric acid and monoglyceride esters at temperatures above about 145° C., polymeric forms of unesterified acid are produced, resulting in reduced yield of ester products. On the other hand, when reacting citric acid with glyceride esters comprising a mixture of fatty acid monoglycerides and fatty acid diglycerides to form the ester product of this invention, the yield of the ester product is substantially 100% of theoretical. It is generally preferred to form the citric acid esters under conditions to avoid formation of polymeric forms of citric acid in order to simplify the process through elimination of steps necessary to affect purification of the product.

In order to prepare the esters of citric acid of this invention, it is necessary that the reactants be present in the proportions of 1 mole of citric acid and between about 2.0 and 3.3 moles of glyceride ester without deleteriously altering the effectiveness of the supplemental agent formed. Preferably the proportion of reactants is 1 mole of citric acid to between 2.7 and 3.0 moles of glyceride ester. In the preparation of the preferred supplemental agent from a mixture of citric acid, ester reactant and saturated aliphatic monohydroxy alcohol, the reactants are present generally in the ratio of about 1 mole of citric acid, 0.5 to 2.5 moles of glyceride ester, 2.5 and 0.5 moles of alcohol, with the total number of moles of ester plus alcohol present being about 2 but not exceeding approximately 3.3 moles. Variations in the proportions of the fatty acid components of the glycerides entering into the reaction makes it possible to vary the reaction products to suit the different systems in which they are to be used. In addition, the replacement of a portion of the fatty acid glycerides with the saturated monohydric alcohol markedly alters the effectiveness of the reaction product. It is preferred that an alcohol such as cetyl alcohol or stearyl alcohol should not be present in amounts exceeding 50% by weight of the reactant mixture. With respect to such alcohols, I have found a tri-ester produced by the reaction of 1 mole of citric acid with 3 moles of, for example, cetyl alcohol, is not a satisfactory supplemental agent, for it behaves in much the same manner as some of the previously mentioned supplemental agents of the prior art which incorporate air into a cake batter without imparting stability against falling in the center during or after baking.

In order to obtain good esterification of citric acid and to produce the particular esters of citric acid of this invention, the reaction is conducted by heating the reactant mixture to a temperature in the range between about 145° C. (293° F.) and 165° C. (329° F.) while maintaining the reactants out of contact with air, for example, by maintaining a nitrogen atmosphere in the reaction vessel.

The esters of citric acid of this invention are useful in either plastic or normally liquid shortenings in amounts of the order of about 0.3% to about 6% based upon the weight of the edible fatty acid triglyceride shortening as a whole, with amounts in the range between about 1 and 3% being preferred.

The citric acid esters of this invention are useful in conjunction with a variety of emulsifiers and additives such as dicetyl citrate, distearyl citrate, glyceryl lactopalmitate, etc. Shortening used in the baking tests listed below are described as containing a glycerol lacto-palmitate emulsifier, i.e., one form of glycerol partial ester. This emulsifier is one of the two forms of emulsifier preferred for compounding of improved shortenings but it is to be understood that the citric acid esters of this invention may be utilized with any suitable emulsifier such as the glyceryl lacto-palmitate emulsifiers prepared by such procedures as, for example, by the method set forth in Iveson et al. Patent No. 2690,971 referred to hereinbefore by direct reaction of one mole of fatty acid monoglyceride with one mole of lactic acid of by the procedure described in my application Serial No. 854,536, entitled "Shortening Agent and Method of Making Same," of which application the present application is a continuation-in-part. As described in that application, glycerol lacto-palmitate emulsifier is prepared by the steps of first removing water from a mixture having substantially an equimolar quantity of fatty acids, i.e., palmitic acid, monohydroxycarboxylic acid, i.e., lactic acid and monovalent basic reacting cation, i.e., sodium. When the mixture has been dehydrated, epihalohydrin in amounts to produce equal molar quantities of fatty acid, hydroxy acid and epihalohydrin is added and the resulting mixture is heated to a temperature in the range between 120° C. and about 200° C. Following cooling of the reacted mixture to about 100° C., the reaction mixture is stirred in contact with boiling water to dissolve the salts and soluble glycerol derivatives. The aqueous layer is removed and discarded. The dried water-insoluble reaction product is essentially a 1,2 and/or 1,3-diglyceride ester having an acid value between about 1 to about 10. Such diglyceride esters are utilized in liquid shortenings in amounts of between 2% and about 20%.

Another type of emulsifier useful in combination with the citrate esters of this invention is known as the fatty acid-lactylic acid esters having up to 8.5 lactylic groups in the compound. The lactylic acid esters may be manufactured by the procedure described in Thomson et al. Patent No. 2,733,252. As described in Example III of that patent, stearyl (2) lactic acid is prepared by reacting 100 parts of stearic acid, 29.1 parts of $K_2CO_3.1-1/2H_2O$ and 45 parts of commercial 85% lactic acid. The mixture is heated with stirring in an inert atmosphere of nitrogen at 200° C. for 45 minutes. At the end of the initial reaction, 45 parts of additional commercial 85% lactic acid is introduced into the reaction mixture and the heating continued for 30 minutes.

The product of this reaction is a light tan, brittle solid possessing a mild caramel odor. The equivalent weight, based upon free acidity analysis indicates the product to be potassium stearyl-2 lactylate which melts in the range of 45.8° C. to 46.2° C. The free acid is obtained by acidifying this potassium salt with hydrochloric acid.

I have discovered that another excellent additive of a new and novel type and which is preferred for use with the citric acid ester of this invention is the ester formed by the reaction of stearoyl chloride and lactic acid or lactic acid polymers. This ester was prepared as follows:

56.2 gms. (0.5 mole) of 80% lactic acid was reacted to a pH of 8.0–9.0 with sodium hydroxide solution. The sodium lactate solution was dried under vacuum (27.5″) to a pot temperature of 130° C. 100 ml. of toluene was added and an azeotropic distillation of the sodium lactate completed the dehydration. Toluene was distilled off until a pot temperature of 115° C. was reached. 151 gms. (0.5 mole) of stearoyl chloride was added slowly, particularly at the beginning, because of the slowness of the reaction due to the insolubility of the sodium lactate. The exothermic reaction was easily controlled at 130° C.

After all the stearoyl chloride was added, the temperature was maintained at 133° C.–136° C. for 1 hour. After completion of the reaction, the remaining solvent was distilled off under vacuum and the product filtered clear using filter-aids to retain the colloidal sodium chloride.

The product was a solid of off-white waxy hard character which at temperatures above about 55° C. melted to a pale yellow liquid. This stearoyl lactic acid product had an acid value of 168.2 and a saponification value of 313.

In Table I below, where shortening compositions are set forth, glycerol lacto-palmitate as prepared above is referred to as "GLP" and stearoyl lactic acid as above described is referred to as "SLA."

The invention will be better understood from the following examples which are given by way of illustration, but without any intention that the invention be limited thereto.

PREPARATION OF REACTION PRODUCTS

Example I 192 grams (1 mole) of anhydrous citric acid is mixed with 1068 grams (3 moles) of cottonseed oil monoglycerides. The reaction vessel is closed and nitrogen gas is passed through the reaction vessel during the heating period. The mixture is continuously agitated and heat is applied to bring the mixture to a temperature of about 155° C. (311° F.) in about 20 minutes and the temperature is maintained at approximately this level for about one hour. The temperature of the reactant mixture is then raised to about 160° C. (327° F.) and maintained at this level for about another hour.

After the two hour reaction period, a vacuum of approximately 25 inches of mercury is applied until the reaction mixture cools below 120° C. (248° F.). The mixture is then filtered. The reaction product recovered by filtration has an acid value of 52.4.

This reaction product may be dispersed in an oil shortening in a substantially stable form as by warming the shortening to about 40° C., stirring the composition until the solution becomes homogeneous and then cooling the mixture to room temperature.

A cottonseed oil shortening containing the reaction product prepared as described above (see Table I) was used to prepare a cake using the cake formulation described in connection with the baking tests. The result of the baking test is set forth in Table II.

Example II 192 grams (1 mole) of anhydrous ctiric acid, 534 grams (1.5 moles) of cottonseed oil monoglycerides and 364 grams (1.5 moles) of cetyl alcohol are mixed in a reaction vessel. The reaction vessel is closed and nitrogen gas is passed through the reaction vessel during the heating period. The mixture is continuously agitated and heat is applied to bring the mixture to a temperature of between 150° C. (302° F.) and 158° C. (316.4° F.); the temperature is maintained at this level for approximately 75 minutes.

After completion of the reaction period, the reaction product is dehydrated under a vacuum of approximately 27 inches of mercury. The anhydrous product recovered has an acid value of 44.6.

A shortening containing the reaction product prepared as described in this example was used to produce a cake in accordance with the cape formula set forth in describing the baking tests. The composition of the shortening is set forth in Table I. The results of the baking test are set forth in Table II.

Example III 133.5 grams (0.375 moles) of glycerol monostearate and 170 grams (0.375 moles) of a mixture of fatty acid monoglycerides and fatty acid diglycerides in which the monoglycerides comprise 65% of the total weight, diglycerides constitute 32% of the total weight, the remainder being triglycerides, the mixture having an iodine value of 46–50, are agitated in a reaction vessel. The vessel is closed and the contents heated while nitrogen gas is passed through the vessel at the rate of 1 liter per minute. The glyceride esters are heated to about 100° C. with constant agitation. 48 grams (0.25 moles) of anhydrous citric acid is added slowly in the form of a powder to the glyceride ester mixture and upon completion of the citric acid addition the temperature is raised to between 151° C. (303.8° F.) and 155° C. (311° F.) for one hour. The temperature of the resulting mixture is then raised to between 160° C. (320° F.) and 163° C. (325.4° F.) and maintained at this level for about one hour.

After the reaction period, the nitrogen gas is cut off and a vacuum of approximately 27½ inches of mercury is applied until the reacted mixture cools below 120° C. (248° F.). At a temperature above its melting point, the ester reaction product is a clear, yellow liquid which at lower temperatures, solidifies to a soft white solid having an acid value of 25.6.

Shortenings containing the reaction product prepared as described in this example were used to produce cakes in accordance with the cake formula set forth in describing the baking tests. The compositions of the shortenings are set forth in Table I and the results of the baking tests are set forth in Table II.

Example IV 39.4 grams (0.188 moles) of anhydrous citric acid, 100 grams (0.28 moles) of cottonseed oil monoglycerides and 76 grams (0.28 moles) of stearyl alcohol are mixed in a reaction vessel. The reaction vessel is closed and nitrogen gas is passed through the reaction vessel during the heating period. The mixture is continuously agitated and heat is applied to bring the mixture to a temperature of between 150° C. (302° F.) and 158° C. (316.4° F.) and the temperature is maintained at this level for approximately 75 minutes.

After completion of the reaction period, the reaction product was dehydrated under a vacuum of approximately 27 inches of mercury, and filtered hot. The anhydrous product which is recovered has an acid value of 48.8.

A shortening containing the reaction product prepared as described in this example was used to produce a cake in accordance with the cake formula set forth in describing the baking tests. The composition of the shortening is set forth in Table I and the results of the baking test are set forth in Table II.

Example V 170 grams (0.375 moles) of a mono-and diglyceride mixture having an iodine value in the range between 46 to 50 in which monoglycerides comprise 65% of the total weight, diglycerides constitute 32% of the total weight, and triglycerides constitute the remainder, and 102 grams (0.375 moles) of stearyl alcohol are agitated in a reaction vessel. The vessel is closed and the contents heated while nitrogen is passed through the vessel at the rate of 1 liter per minute. The glyceride ester-alcohol mixture is heated to about 100° C. with constant agitation. 48 grams (0.25 moles) of anhydrous citric acid is added slowly in the form of a powder to the ester-alcohol mixture and upon completion of the citric acid addition the temperature is raised to between 150° C. and 155° C. for 1 hour. The temperature of the resulting mixture is then raised to between 160° C. and 165° C. and maintained at this level for about 1 hour. After the reaction period, the nitrogen gas is cut off and a vacuum of approximately 27 inches of mercury is applied until the reacted mixture cools below 120° C. Some citric acid polymer is formed in this preparation and is separated from the clear layer by filtration. The product of this reaction is a plastic solid having an acid value of 23.8.

Example VI 270 grams (1 mole) of stearyl alcohol and 456 grams (1 mole) of a monoglyceride and diglyceride mixture in which monoglycerides comprise 65% of the total weight, diglycerides constitute 32% of the total weight, and triglycerides constitute the remainder are agitated in a closed vessel and the contents heated while nitrogen is passed through the vessel at a rate of 1 liter per minute. The glyceride ester material is heated to approximately 100° C. with constant agitation. 192 grams (1 mole) of anhydrous citric acid is added in the form of a powder to the glyceride material and upon completion of the citric acid addition the temperature is raised to between 160° C. and 165° C. and maintained at this level for about 1 hour under vacuum and concurrent passage of nitrogen gas. The reacted mixture is cooled below 120°

C. and filtered. The product of this reaction is a plastic solid having an acid value of 60.

The efficacy of the reaction products prepared as described in the examples as a portion of multicomponent compositions of matter utilized in the preparation of food products was tested in the following ways.

*Cakes.*—Various reaction products were incorporated in shortenings in the proportions set forth in Table I. The shortenings were used to produce cakes.

In the baking tests the following cake formula, which is widely used in industry as a means of comparing shortenings was utilized.

|  | Ozs. |
|---|---|
| Cake flour | 7¾ |
| Granulated sugar | 10¼ |
| Baking powder | ½ |
| Salt | ¼ |

To the above ingredients was added 100 grams of the shortening to be tested (compositions given in Table I below) and 5 ozs. of liquid skim milk, the mixture being beaten for one minute with an electric mixer.

To this shortening-containing mixture was added 3 ozs. of liquid skim milk, 4 ozs. of egg whites, 5 ml. of vanilla extract and the mixture was then beaten for 3 minutes with an electric mixer to produce a batter having the specific gravity given in Table II below.

15 ozs. of the batter was placed in an 8 inch cake pan and the batter was then baked at 190.5° C. (375°F.) for 26 minutes.

TABLE I.—COMPOSITION OF SHORTENINGS

| Designation | Shortening | Percent | Emulsifier | Percent | Reaction Products | Percent |
|---|---|---|---|---|---|---|
| A | Commercial Plastic | 100 | | | | |
| B | do | 100 | | | | |
| C | Cottonseed Oil | 100 | | | | |
| D | do | 96 | GLP | 4 | | |
| E | do | 96 | | | Ester of Example III | 4 |
| F | do | 95 | GLP | 4 | Tri cetyl ester of citric acid | 1 |
| G | Hydrogenated Fat (no added emulsifier) | 95 | GLP | 4 | Ester of Example II | 1 |
| H | Cottonseed Oil | 96 | SLA | 3 | Ester of Example III | 1 |
| I | do | 96 | SLA | 2 | do | 2 |
| J | Hydrogenated Fat (no added emulsifier) | 96 | SLA | 2 | do | 2 |
| K | Cottonseed Oil | 96 | SLA | 2 | Ester of Example IV | 2 |
| L | do | 95 | GLP / SLA | 3 / 1 | Ester of Example IV | 1 |
| M | do | 95 | GLP | 4 | do | 1 |
| N | do | 95 | GLP | 4 | Ester of Example I | 1 |
| O | do | 95 | GLP | 4 | Ester of Example III | 1 |
| P | do | 95 | GLP | 4 | Ester of Example V | 1 |
| Q | Hydrogenated Fat (no emulsifier) | 96 | Stearyl (2) Lactylic acid | 2 | Ester of Example IV | 2 |
| R | Cottonseed Oil | 96 | do | 2 | do | 2 |
| S | do | 96 | SLA | 2 | Ester of Example VI | 2 |

In Table II, there are set forth the results of baking tests made with the shortenings set forth above in Table I, and utilizing the cake formula and baking technique given above.

TABLE II.—EVALUATION OF BATTERS AND CAKES

| Designation | Specific Gravity of Batter | Average Vol. of Cake (ml.) | Cake Character | |
|---|---|---|---|---|
| | | | Texture | Form |
| A | .93 | 1,095 | Good | Good Peak. |
| B | 1.0 | 1,100 | do | Do. |
| C | 1.1 | 980 | Coarse and Heavy | Low Sides, Flat Top. |
| D | 0.94 | 1,105 | Center Coarse and Heavy | Center Fell. |
| E | 1.1 | 980 | Poor, Coarse and Heavy | Dark Ring on Top. |
| F | 0.91 | 1,100 | Center Coarse and Heavy | Center Fell. |
| G | .94 | 1,240 | Very Good | Very Good. |
| H | .98 | 1,155 | Slightly Open and Even—Good | Sides Up Uniformly. |
| I | .90 | 1,165 | Very Good, Slightly Open | Sides High, Center Full, Even Color. |
| J | .88 | 1,265 | Good, Slightly Open with some Small Holes | Sides High Center Full. |
| K | 1.0 | 1,175 | Fair, Slightly Coarse | Sides High. |
| L | 0.92 | 1,210 | Excellent, Slightly Open | High Sides, Full Top, Even Color. |
| M | 0.94 | 1,180 | Excellent | High Sides, Nice Top. |
| N | 0.93 | 1,165 | Very Good, Slightly Open | Good Peak. |
| O | 0.94 | 1,120 | Very Good, Slightly Open Uniform | Do. |
| P | 0.89 | 1,125 | Very Good | Very Good. |
| Q | 1.0 | 1,140 | Fine and Even | Low Sides, Irregular Top Surface. |
| R | 0.93 | 1,220 | Open and Irregular (blow holes) | Good Peak, High Sides. |
| S | 0.91 | 1,150 | Even Grain | Medium Sides, Good Peak. |

It will be seen from Table II that the citric acid ester supplemental agents function to improve the volume, texture or appearance of cakes. Comparison of cakes prepared from shortenings A and B with any of the shortenings G to R, shows that shortenings containing an emulsifier and a citric acid ester supplemental agent made in accordance with the present invention, produced cakes of volume and cake character superior to those produced when utilizing commercially available plastic shortenings. Comparison of cakes prepared from shortenings G and J which have a plastic shortening base with shortenings H and M which have an oil shortening base shows that the supplemental agents of this invention effectively improve the cake products produced by both forms of shortenings.

Comparison of cakes prepared from shortenings I, K, M and O shows that while citrate esters such as those prepared according to Example III, enhance the effectiveness of emulsifiers, the esters containing aliphatic monohydroxy alcohol show greater effectiveness with a greater variety of emulsifiers.

*Icings.*—Butter-cream icings are universally used in the baking industry. These icings are composed basically of a mixture of powdered sugar, shortenings and water.

In the evaluation of shortenings for icings the following compositions were prepared by mixing emulsifiers, and/or the reaction products of this invention into plastic shortening.

One pound quantities of shortening blends were prepared by adding the reaction product to approximately 100 grams of plastic shortening to produce a concentrate. This concentrate was then added to the balance of the shortening and incorporated by mixing for 5 minutes in a Hobart Kitchen-Aid mixer. After mixing the finished plastic shortening was tempered for 12 hours at 80° F. before conducting the creaming tests.

Creaming tests were conducted using the following formula:

Powdered sugar (10 X fineness) _____grams__ 681
Shortening _____do____ 150.3
Water _____do____ 165.3

The sugar, shortening and one-half of the quantity of water were mixed in a Hobart mixing mixer until a thick paste formed. On completion of the preliminary mixing, the balance of the water was added and the speed of mixing increased. After completion of 24 minutes at the higher mixing speed the specific gravity of the icing was determined and the condition of the icing was noted. The finished icings were stored at 70° F. in closed containers for a period of 24 hours at which time they were examined for weeping.

The compositions of the icings are set forth in Table III and the results of the icing tests are set forth in Table IV.

effective alone or in combination with emulsifiers to suppress weeping.

*Whipped toppings for desserts.*—Whipped toppings are composed basically of a mixture of liquid fat, non-fat milk solids and water.

In the evaluation of shortenings for use in whipped toppings the following compositions were prepared by adding the reaction products of this invention to the warm liquid fat.

Whipped toppings for testing were prepared using the following formula:

| | Percent by weight |
|---|---|
| Shortening | 30 |
| Non-fat milk solids | 8 |
| Water | 62 |

The shortening, skim milk solids, and water were mixed to a smooth composition. The mixture was heated to 74° C. (165° F.) with agitation and held at that temperature for 30 minutes. Upon completion of the heating, the mixture was passed through a homogenizer and cooled to approximately 3° C. (37.4° F.). This chilled mix was whipped using a Hobart Kitchen Air mixer with a wire whip for 2 minutes. At this point the appearance, condition, taste, and volume of the topping were observed. The compositions of the shortening are set forth in Table V and the results of the tests are set forth in Table VI.

TABLE V

| Designation | Shortening | Emulsifier | Percent | Reaction Product | Percent |
|---|---|---|---|---|---|
| aa | Hydrogenated Coconut Oil (Control). | | | | |
| bb | ____do____ | Tween 60 [1] | 0.25 | | |
| cc | ____do____ | Tween 60 [1] | 0.20 | Ester of Ex. IV | 0.1 |
| dd | ____do____ | Mono Diglyceride | 0.25 | | |
| ee | ____do____ | ____do____ | 0.20 | Ester of Ex. IV | 0.1 |
| ff | ____do____ | Stearoyl Lactic Acid | 0.25 | | |
| gg | ____do____ | ____do____ | 0.20 | Ester of Ex. IV | 0.1 |

[1] A polyoxyalkylene derivative of hexitol anhydride partial long chain fatty acid ester.

TABLE VI

| Designation | Specific Gravity, cc./100 gm. | Flavor | Appearance of Finished Toppings |
|---|---|---|---|
| aa | 33.7 | Oily | Weak peaks; no air retention; emulsion collapsed. |
| bb | 33.7 | Good | Glossy; firm peaks; slight weeping. |
| cc | 33.0 | ____do____ | Glossy; firm peaks; no weeping. |
| dd | 43.6 | Oily (greasy) | Unstable poor emulsion; large air cells; emulsion collapsed. |
| ee | 27.3 | Very slightly greasy. | Slightly thick firm peaks; no weeping. |
| ff | 36.7 | Good | Sensitive emulsion; slight break; weak peaks. |
| gg | 46.0 | ____do____ | Light fluffier, more stable emulsion than ff. |

TABLE III

| Designation | Base | Percent | Emulsifier | Percent | Reaction Products | Percent |
|---|---|---|---|---|---|---|
| S | Hydrogenated fat | | No added emulsifier | | | |
| T | ____do____ | 98 | | | Ester of Ex. IV | 2 |
| U | Hydrogenated veg. fat | | Control | | | |
| V | ____do____ | 94 | Monodiglycerides | 6 | | |
| W | ____do____ | 92 | ____do____ | 6 | Ester of Ex. IV | 2 |

TABLE IV

| Designation | Specific Gravity, cc./100 gms. | Appearance of Icing | Appearance After 24 Hours at 70° F. |
|---|---|---|---|
| S | 93.3 | Light, fluffy, firm | Slight weeping. |
| T | 101.3 | ____do____ | No weeping. |
| U | 79.2 | Curdled, wet, weak emulsion. | Weeping, free water. |
| V | 123.3 | Heavy, firm | Slight weeping. |
| W | 119.7 | ____do____ | No weeping. |

Comparison of the icings prepared using the multicomponent compositions shows that the citrate esters are Comparison of the whipped toppings containing the citrate esters of this invention shows that the esters are effective in combination with emulsifiers to suppress weeping.

*Peanut butter.*—Emulsifiers are utilized in peanut butter as a means to improve the smoothness in spreading to eliminate stickiness in the mouth and to retard separation of oil.

In the evaluation of the reaction products for use in peanut butter unmodified, i.e., unhydrogenated, peanut butter, various percentages of emulsifiers with and without reaction products were incorporated therein. In a second series of tests the identical levels of additives were incorporated, the addition of additives being made to the separated peanut oil which was then remixed back into the peanut butter solids. In both series, the products were stored at 70° F. and examined after 2 and 10 weeks' storage time for free oil, general mouth feel and taste. The peanut butter compositions are set forth in Table VII and the results of the tests are set forth in Table VIII.

Generally, levels of 0.3%–1.0%, preferably 0.5% of the reaction product of this invention were sufficient to eliminate the need for hydrogenation to prevent separation of oil. The above expressed levels of use of reaction products were also sufficient to produce in a finished peanut butter a better mouth feel and to eliminate the usual stickiness associated with this type of product.

The above detailed description of this invention has been given for clearness of understanding only. No unnecessary limitations should be understood therefrom, as modifications will be obvious to those skilled in the art.

TABLE VII

| Designation | Material | Emulsifier | Percent | Reaction Product | Percent |
|---|---|---|---|---|---|
| h | Peanut Butter | | | | |
| i | do | Glyceryl lacto palmitate | 1.5 | | |
| j | do | do | 1.5 | Ester of Ex. IV | 0.5 |

TABLE VIII

| Designation, Emulsifier Added to Peanut Butter | Peanut Butter Evaluations | | | |
|---|---|---|---|---|
| | Two Weeks Storage at 70° F. | | Ten Weeks Storage at 70° F. | |
| | Free Oil | Mouth Feel | Free Oil | Mouth Feel |
| h | 3.0 | Sticky-dry | 10.0 | Sticky-dry. |
| i | 0.5 | Slightly sticky | 7.0 | Slightly sticky. |
| j | 1.0 | Smooth | 1.0 | Smooth, good mouth feel. |

I claim:

1. A composition comprising a product prepared by the reaction of 1 mole of citric acid and a total of between 2.0 and 3.3 moles of reactant and having an acid number in the range between about 12 and about 75 reactant consisting of fatty acid monoglycerides and stearyl alcohol and said reaction being carried out by heating the mixture to a temperature in the range between 145° C. and 165° C. in an inert atmosphere and under conditions to remove water vapor.

2. A composition comprising a product prepared by the reaction of 1 mole of citric acid and between 2.0 and 3.3 moles of reactant and having an acid number in the range between about 12 and about 75 said reactant consisting of a mixture of fatty acid monoglyceride, fatty acid, diglyceride and stearyl alcohol and said reaction being carried out by heating the mixture to a temperature in the range between 145° C. and 165° C. in an inert atmosphere and under conditions to remove water vapor.

3. The method of producing an ester reaction product which comprises reacting citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in an amount providing between 2.0 and about 3.3 moles of reactant per mole of citric acid, by heating the mixture to a temperature in the range between 145° C. and 165° C. in an inert atmosphere and under conditions to remove water vapor.

4. The method of producing an ester reaction product which comprises reacting citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in an amount providing between 2.7 and about 3.0 moles of reactant per mole of citric acid, by heating the mixture to a temperature in the range between 145° C. and 165° C. in an inert atmosphere and under conditions to remove water vapor.

5. The method of producing an ester reaction product which comprises reacting one mole of citric acid with 1.5 moles of glycerol monostearate, and 1.5 moles of a mixture of fatty acid monoglyceride other than said glycerol monostearate and fatty acid diglyceride by heating the mixture to a temperature in the range between 145° C. and 165° C. in an inert atmosphere and under conditions to remove water vapor.

6. The method of producing an ester reaction product which comprises reacting one mole of citric acid with 1.5 moles of stearyl alcohol, and 1.5 moles of a mixture of fatty acid monoglyceride and fatty acid diglyceride by heating the mixture to a temperature in the range between 145° C. and 165° C. in an inert atmosphere and under conditions to remove water vapor.

7. A composition comprising a product having an acid number in the range between about 12 and about 75 prepared by the reaction of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

8. A composition according to claim 7 in which the reactant is present in a total amount equal to between 2.7 and 3.0 moles of reactant per mole of citric acid.

9. A multicomponent composition of matter comprising edible fatty acid triglycerides containing therein an edible ester emulsifier and 0.3% to 6% based upon the weight of the multicomponent composition of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

10. A multicomponent composition according to claim 9 in which the reaction product is produced from a glyceride ester reactant in which the glycerol is partially esterified with fatty acid.

11. A multicomponent composition of matter comprising edible fatty acid triglycerides containing therein an edible ester emulsifier and 0.3% to 6% based upon the weight of the multicomponent composition of the reaction product having an acid number in the range between about 50 and about 75 prepared by reaction of one mole of citric acid and a total of three moles of reactant consisting of fatty acid monoglycerides and stearyl alcohol and said reaction being carried out by heating the mixture to a temperature in the range between 145° C. and 165° C. in an inert atmosphere and under conditions to remove water vapor.

12. A multicomponent composition of matter comprising edible fatty acid triglycerides containing therein a fatty acid-lactylic acid ester of up to 8.5 lactylic groups and 0.3% to 6% based upon the weight of the multicomponent composition of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

13. A multicomponent composition according to claim 12 in which the fatty acid lactylic acid ester is stearyl (2) lactylic acid ester.

14. A shortening effective for the production of baked goods, comprising edible fatty acid triglycerides containing therein an edible ester emulsifier and 0.3% to 6% based upon the weight of the shortening of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

15. A shortening effective for the production of baked goods, comprising edible fatty acid triglycerides containing therein an ester emulsifier and 0.3% to 6% based upon the weight of the shortening of the reaction product having an acid number in the range between about 50 and about 75 prepared by reaction of one mole of citric acid and a total of three moles of reactant consisting of fatty acid monoglycerides and stearyl alcohol and said reaction being carried out by heating the mixture to a temperature in the range between 145° C. and 165° C. in an inert atmosphere and under conditions to remove water vapor.

16. A shortening effective for the production of baked goods, comprising edible fatty acid triglycerides containing therein an ester emulsifier and 0.3% to 6% based upon the weight of the shortening of the reaction product having an acid number of approximately 52.4 prepared by reaction of one mole of citric acid and a total of three moles of reactant consisting of a mixture of stearyl alcohol and a mixture of fatty acid monoglyceride and fatty acid diglyceride and said reaction being carried out by heating the mixture to a temperature in the range between 145° C. and 165° C. in an inert atmosphere and under conditions to remove water vapor.

17. A normally liquid shortening effective for the production of baked goods, comprising edible fatty acid triglyceride oil containing therein an ester emulsifier and 0.3% to 6% based upon the weight of the shortening of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

18. A shortening according to claim 17 in which the fatty acid triglyceride oil is an edible hydrogenated fat.

19. A normally liquid shortening effective for the production of baked goods, comprising edible fatty acid triglyceride oil containing therein a glycerol partial ester emulsifier and 0.3% to 6% based upon the weight of the shortening of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.7 and 3.3 moles of reactant per mole of citric acid and said reaction being carried out by heating the mixture to a temperature in the range between 145° C. and 165° C. in an inert atmosphere and under conditions to remove water vapor.

20. A normally liquid shortening effective for the production of baked goods, comprising edible fatty acid triglyceride oil containing therein a stearoyl-lactic acid additive and 0.3% to 6% based upon the weight of the shortening of the reaction product having an acid number in the range between about 12 and about 75 prepared by reaction of one mole of citric acid with a reactant selected from the group consisting of mixtures of fatty acid monoglycerides and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

21. A normally liquid shortening effective for the production of baked goods, comprising edible glyceride oil containing therein, a glycerol partial ester emulsifier and a stearoyl-lactic acid product and 0.3% to 6% based upon the weight of the shortening of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.0 and 3.3 moles of reactant per mole of citric acid and said reaction being carried out by heating the mixture to a temperature in the range between 145° C. and 165° C. in an inert atmosphere and under conditions to remove water vapor.

22. A normally liquid shortening effective for the production of baked goods, comprising edible glyceride oil containing therein, a glycerol partial ester emulsifier and a stearoyl-lactic acid product and 0.3% to 6% based upon the weight of the shortening of the reaction product having an acid number in the range between about 12 and about 75 prepared by reaction of one mole of citric acid with a reactant selected from the group consisting of mixtures of fatty acid monoglyceride and a saturated monohydric alcohol having 12 to 24 carbon atoms and mixtures of fatty acid monoglyceride and fatty acid diglyceride and a saturated monohydric alcohol having 12 to 24 carbon atoms, said reactant being present in a total amount equal to between 2.7 and 3.0 moles of reactant per mole of citric acid and said reaction being carried out by heating the mixture to a temperature in the range between 145° C. and 165° C. in an inert atmosphere and under conditions to remove water vapor.

23. A shortening effective for production of baked goods comprising edible glyceride oil having shortening properties and from about 2% to about 20% based upon the weight of the shortening of a diglyceride ester mixture of 1, 2 and 1, 3 diglycerides in which the 1 position is esterified with monohydroxy aliphatic monocarboxylic acid having an aliphatic hydrocarbon group of 2 to 7 carbon atoms and one of the two remaining positions is esterified with fatty acid containing from 12 to 20 carbon atoms and 0.3 to 1.5% based upon the weight of the shortening of the reaction product of cottonseed oil monoglycerides, cetyl alcohol and citric acid, said reaction product being formed by heating the mixture to a temperature in the range between 145° C. and 165° C. in an inert atmosphere and under conditions to remove water vapor.

24. A normally liquid shortening effective for the production of baked goods comprising a normally liquid edible triglyceride oil containing therein from about 2% to about 20% based upon the weight of the shortening of a diglyceride ester mixture of 1, 2 and 1, 3 diglycerides in which the 1 position is esterified with monohydroxy aliphatic monocarboxylic acid having an aliphatic hydrocarbon group of 2 to 7 carbon atoms and one of the two remaining positions is esterified with fatty acid containing from 12 to 20 carbon atoms and containing from about 0.3% to 1.5% based upon the weight of the shortening as a whole of the reaction product of fatty acid monoglyceride, citric acid and saturated aliphatic monohydric alcohol of 14 to 18 carbon atoms, said product being prepared by reaction of 1 mole of citric acid and a total of between 2.0 and 3.3 moles of the combination of fatty acid monoglyceride and saturated aliphatic monohydric alcohol, said reaction being carried out by heating the mixture to a temperature in the range between 145° C. and 165° C. in an inert atmosphere and under conditions to remove water vapor.

25. A shortening effective for the production of baked goods comprising edible fatty acid triglycerides containing therein an edible ester emulsifier and 1.0% to 3% based upon the weight of the shortening of the reaction product of cottonseed oil glycerides, saturated aliphatic monohydric alcohol having 12 to 24 carbon atoms and citric acid, said product being prepared by reaction of 1 mole of citric acid and a total of between 2.0 and 3.3 moles of the combination of fatty acid monoglyceride and saturated aliphatic monohydric alcohol, said reaction being carried out by heating the mixture to a temperature in the range between 145° C. and 165° C. in an inert atmosphere and under conditions to remove water vapor.

References Cited by the Examiner

UNITED STATES PATENTS

| | | | |
|---|---|---|---|
| 2,329,166 | 9/1943 | Tucker | 260—410 |
| 2,473,460 | 6/1949 | Werntz | 260—484 |
| 2,552,706 | 5/1951 | Bertram | 52—312 |
| 2,690,971 | 10/1954 | Iveson et al. | 99—118 |
| 2,813,032 | 11/1957 | Hall | 99—163 |
| 2,864,705 | 12/1958 | Schulman | 99—118 |
| 2,938,027 | 5/1960 | Gladstone | 99—123 |
| 2,973,270 | 2/1961 | Thompson et al. | 99—123 |
| 3,042,530 | 7/1962 | Kidger | 99—118 |

A. LOUIS MONACELL, *Primary Examiner.*

ABRAHAM H. WINKLESTEIN, *Examiner.*